(12) United States Patent
Bierlein et al.

(10) Patent No.: US 12,066,055 B2
(45) Date of Patent: Aug. 20, 2024

(54) ROLLER BEARING WITH A SEAL

(71) Applicant: Schaeffler Technologies AG & Co. KG, Herzogenaurach (DE)

(72) Inventors: Andreas Bierlein, Haßfurt (DE); Rainer Schroeder, Egenhausen (DE); Lukas Paehler, Schöneck (DE); Simon Wolf, Kleinlangheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 120 days.

(21) Appl. No.: 17/798,884

(22) PCT Filed: Jan. 8, 2021

(86) PCT No.: PCT/DE2021/100005
§ 371 (c)(1),
(2) Date: Aug. 10, 2022

(87) PCT Pub. No.: WO2021/160201
PCT Pub. Date: Aug. 19, 2021

(65) Prior Publication Data
US 2023/0082969 A1    Mar. 16, 2023

(30) Foreign Application Priority Data

Feb. 13, 2020    (DE) .................... 10 2020 103 730.9

(51) Int. Cl.
*F16C 33/58*    (2006.01)
*F16C 19/36*    (2006.01)
(Continued)

(52) U.S. Cl.
CPC .......... *F16C 23/086* (2013.01); *F16C 19/364* (2013.01); *F16C 19/38* (2013.01);
(Continued)

(58) Field of Classification Search
CPC ...... F16C 19/364; F16C 19/38; F16C 23/086; F16C 33/586; F16C 33/784;
(Continued)

(56) References Cited

U.S. PATENT DOCUMENTS 2,659,617 A    11/1953    Cobb
3,519,316 A *   7/1970    Gothberg .............. F16C 33/768
                                                    277/390
(Continued)

FOREIGN PATENT DOCUMENTS

CN    105673711 A    6/2016
CN    208749814 U    4/2019
(Continued)

*Primary Examiner* — Phillip A Johnson

(57) ABSTRACT

A rolling bearing has an inner and an outer bearing ring. Each bearing ring has an inner and an outer shell surface. The roller bearing has rolling elements, which roll on raceways provided on the respective shell surfaces of the bearing rings, and a sealing disc connected to one of the bearing rings and operatively connected in a sealing manner to the other bearing ring. To connect the sealing disc to the bearing ring, one of the shell surfaces of the one bearing ring includes a first connecting means and the sealing disc includes a second connecting means. The first connecting means provide a rotating engagement in which the second connecting means engage in a connected state of the bearing ring and the sealing disc.

19 Claims, 5 Drawing Sheets

(51) Int. Cl.
*F16C 19/38* (2006.01)
*F16C 23/08* (2006.01)
*F16C 33/78* (2006.01)

(52) U.S. Cl.
CPC .......... *F16C 33/586* (2013.01); *F16C 33/784* (2013.01); *F16C 33/7856* (2013.01); *F16C 33/7869* (2013.01); *F16C 33/7886* (2013.01); *F16C 33/7889* (2013.01); *F16C 2226/60* (2013.01); *F16C 2226/72* (2013.01); *F16C 2300/14* (2013.01); *F16C 2360/31* (2013.01)

(58) Field of Classification Search
CPC .............. F16C 33/7843; F16C 33/7856; F16C 33/7869; F16C 33/7886; F16C 33/7889; F16C 2226/60; F16C 2226/70; F16C 2226/72; F16C 2226/76; F16C 2226/78; F16C 2300/14
See application file for complete search history.

(56) References Cited

U.S. PATENT DOCUMENTS

| | | | | |
|---|---|---|---|---|
| 3,594,050 | A * | 7/1971 | Gothberg | F16C 35/067 |
| | | | | 384/484 |
| 3,683,475 | A | 8/1972 | Mackas | |
| 4,872,770 | A * | 10/1989 | Dickinson | F16C 33/7886 |
| | | | | 277/575 |
| 5,489,156 | A * | 2/1996 | Martinie | F16C 33/586 |
| | | | | 384/585 |
| 5,711,616 | A * | 1/1998 | Gassmann | F16C 19/385 |
| | | | | 384/489 |
| 7,153,029 | B2 * | 12/2006 | Monetti | F16C 41/007 |
| | | | | 384/489 |
| 8,628,249 | B2 * | 1/2014 | Winkelmann | F16C 33/726 |
| | | | | 277/552 |
| 2010/0033965 | A1 | 2/2010 | Casey et al. | |

FOREIGN PATENT DOCUMENTS

| | | | |
|---|---|---|---|
| CN | 110454505 A | 11/2019 | |
| CN | 111706612 A | 9/2020 | |
| DE | 599458 C | 7/1934 | |
| DE | 102010061932 B3 | 6/2012 | |
| DE | 102011078840 A1 * | 1/2013 | ............ B63B 39/06 |
| DE | 102012000757 A1 | 7/2013 | |
| DE | 102012202592 A1 | 8/2013 | |
| DE | 102012206892 A1 | 10/2013 | |
| DE | 102012207745 A1 | 11/2013 | |
| DE | 102013226557 A1 | 6/2015 | |
| DE | 102017110973 A1 | 11/2018 | |
| DE | 102019200371 A1 | 7/2019 | |
| EP | 2886895 A2 | 6/2015 | |
| EP | 2913547 A1 | 9/2015 | |
| JP | 2014001811 A | 1/2014 | |
| JP | 2019184004 A | 10/2019 | |
| TW | 201515945 A | 5/2015 | |
| WO | 2009109162 A2 | 9/2009 | |
| WO | 2011138107 A1 | 11/2011 | |
| WO | 2013007545 A1 | 1/2013 | |
| WO | 2015012337 A1 | 1/2015 | |

* cited by examiner

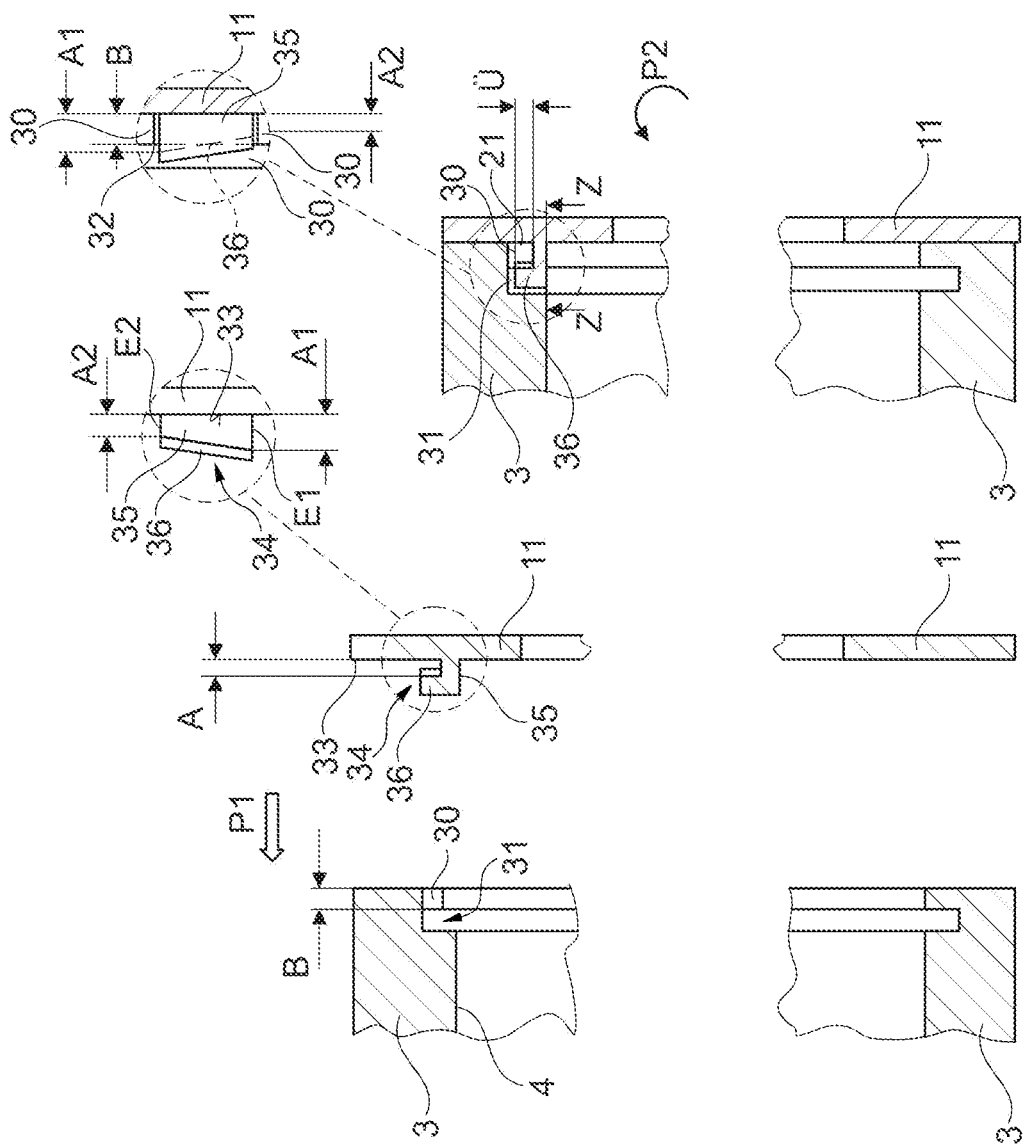

ROLLER BEARING WITH A SEAL

CROSS-REFERENCE TO RELATED APPLICATIONS

This application is the U.S. National Phase of PCT Appln. No. PCT/DE2021/100005 filed Jan. 8, 2021, which claims priority to DE 102020103730.9 filed Feb. 13, 2020, the entire disclosures of which are incorporated by reference herein.

TECHNICAL FIELD

The disclosure relates to sealing of a rolling bearing, more particularly to the fastening of seals to bearing rings of large bearings.

BACKGROUND

In order to protect the bearing space in which the rolling elements roll against external environmental influences and/or to prevent the escape of lubricant located in the bearing space for lubricating the rolling elements, seals can be provided at the axial ends of the bearing rings, one edge of which is connected to one of the bearing rings of the rolling bearing in a non-rotatable manner and the other edge of which, often provided with a sealing lip, is operatively connected in a sealing manner to the other bearing ring.

A seal for a spherical roller bearing is described in DE102013226557 A1, which comprises a sealing disc, one edge of which is provided with a sealing lip made of an elastic material and the other edge of which is connected to one of the bearing rings. According to one embodiment of DE102013226557 A1, the sealing disc and bearing ring are connected by means of a plurality of screws by inserting the screws through holes in the sealing disc and screwing them into threaded holes on the face of the bearing ring. Apart from the fact that this method of fastening the sealing disc requires additional components, namely screws, for fastening, the provision of threaded holes in the bearing ring reduces its strength. In addition, the connection of the scaling disc and bearing ring is very time-consuming due to the tightening of the many screws. According to another embodiment of DE102013226557 A1, the connection between the sealing disc and the bearing ring is effected by providing a dovetail-shaped groove in one of the bearing rings, into which an edge of the sealing disc complementary to the groove is pressed. Even though this embodiment eliminates the need for additional fastening means to secure the sealing disc, the connection is difficult to establish because it requires the sealing disc to be deformed radially inward, which becomes increasingly difficult as the size of the sealing disc increases, even if it is made of a flexible material, and is completely impossible with sealing discs made of metal, which is a very common material.

In addition. U.S. Pat. No. 2,659,617 describes, for example, that the edge of the sealing disc, which is intended to be secured to a bearing ring, is additionally provided with an elastic edge layer. For this purpose, the edge of the sealing disc is elaborately formed together with the elastic edge layer in such a manner that, after the forming step, the elastic edge layer is fixed to the edge of the sealing disc by the forming and, at the same time, the elastic edge layer forms the radially outermost closure of the unit consisting of the scaling disc and elastic edge layer. The scaling disc formed in this way is then connected to the bearing ring in such a manner that the sealing disc is pressed into the bore of the bearing ring, wherein the elastic edge layer is elastically deformed and expands into a circumferential groove provided on the bearing ring after the sealing disc has reached its final position in the bore of the bearing ring.

It is also conceivable to prepare the sealing disc for connection to a bearing ring by injecting an elastic edge layer. Even though this eliminates the need for mechanical forming of the sealing disc, this type of preparation is very costly in terms of equipment needed and is therefore suitable for mass-produced bearings and not for large bearings, which are often only manufactured in very small quantities.

SUMMARY

The disclosure is based on providing an exemplary embodiment of sealing discs for large bearings which can be connected in a simple manner to bearing rings of such large bearings without the need for further components.

It is advantageous if the sealing disc is formed of metal or plastic and is provided with a sealing lip made of rubber or a flexible plastic.

If one of the two shell surfaces of one of the two bearing rings includes a first connecting means and the sealing disc includes a second connecting means, wherein the first connecting means provide a rotating engagement in which the second connecting means engage in a connected state of the bearing ring and the sealing disc, the components intended for connection already provide the respective connecting means required for the connection thereof, i.e., no further components are required to establish a connection between the components intended for connection. This is particularly advantageous because the components intended for connection usually have to be machined, so that the respective connecting means can be formed as well during machining.

The first and second connecting means can be formed together with the manufacture of the two components if the connecting means are formed by threads, because, as is usual with bearing rings, turning operations, for example for machining raceways, have to be carried out anyway and threads can therefore also be formed.

An additional space requirement for the sealing disc connected to the bearing ring is avoided if the bearing ring, which is provided with first connecting means, is provided with a radial shoulder on which the first connecting means are formed and whose diameter is different from the diameter of the inner and outer shell surfaces of this bearing ring.

Complex screwing movements for connecting the sealing disc and the bearing disc are avoided if the first connecting means has a first annular edge and the second connecting means has a second annular edge which is likewise exposed, wherein in the connected state of the respective bearing ring and the sealing disc both annular edges overlap one another in an overlap region Ü when at least the first annular edge is provided with at least one opening, when the second annular edge is formed by at least one shoulder segment, wherein a plane in which the respective shoulder segments lie maintains an axial distance A from a plane of the sealing disc, and the respective openings and respective shoulder segments are complementary to one another.

The connecting means can be secured together via wedging by rotating one annular edge with respect to the other annular edge when each shoulder segment has first and second ends E1, E2 in a circumferential direction, wherein axial distances A1, A2 of the first and second ends E1, E2 of the respective shoulder elements to the plane of the sealing disc are different.

A lubricant leakage between the connecting means is prevented if an O-ring is provided between the sealing disc and an end face of the bearing ring to which the sealing disc is connected if receptacles are provided on the sealing disc which are suitable for receiving tools and/or grub screws, these receptacles not only facilitate the rotation of the sealing disc relative to the bearing ring during assembly by receiving appropriate tools, but can also be used, when the sealing disc has assumed its end position in the bearing ring, to secure the sealing disc against rotating relative to the bearing ring by screwing in grub screws.

BRIEF DESCRIPTION OF THE DRAWINGS

The disclosure will now be explained in more detail with reference to the figures. In the figures:

FIGS. 5a-d show a fifth embodiment.

DETAILED DESCRIPTION

Figure 1:
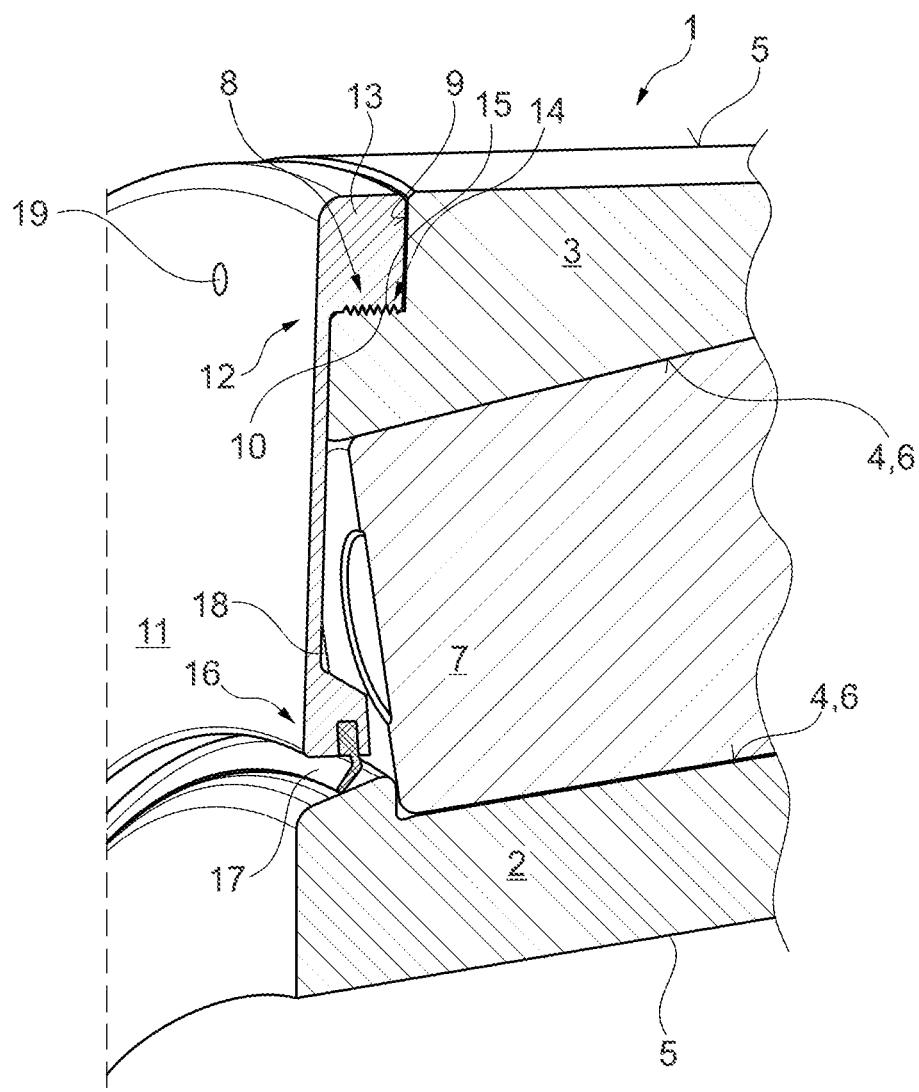
FIG. 1 shows a perspective of a rolling bearing sectional view.

FIG. 1 shows a rolling bearing 1, which has an inner bearing ring 2 and an outer bearing ring 3. Each of these two bearing rings 2, 3 has an inner and outer shell surface 4, 5. These bearing rings 2, 3 are bearing rings of a large bearing, which in the context of this application means outside diameters of more than 320 millimeters (mm), e.g., 600 mm, more than 1,000 mm, etc. Raceways 6 are provided on the respective inner shell surfaces 4 of the two bearing rings 2, 3, on which rolling elements 7 roll. Even though the rolling bearing 1 shown here is a spherical roller bearing, the application of the disclosure is not limited to spherical roller bearings, but can also be used with cylindrical roller bearings or tapered roller bearings.

According to the embodiment in FIG. 1, the outer shell surface 5 of the outer bearing ring 3 is lowered radially inward at its axial ends, thereby providing a radial shoulder 8 and a ring wall 9. As can be seen in FIG. 1, the radial shoulder 8 has a diameter different from both the inner and outer shell surfaces 4, 5 of this bearing ring 3. This radial shoulder 8 is provided with first connecting means in the form of an external thread 10.

Furthermore, the embodiment in FIG. 1 shows a sealing disc 11, which is made of metal and is essentially circular in shape. Essentially circular in shape means that the sealing disc 11 extends circumferentially about an axis even if the sealing disc 11 deviates from a perfect circle. For the sake of completeness only, it should be noted that in another exemplary embodiment not shown, the sealing disc 11 can also be formed from a less flexible plastic, such as PEEK. Adjacent to an outer edge 12 of the sealing disc 11 is an axial flange 13, an inner edge surface 14 of which is provided with a second connecting means in the form of an internal thread 15.

An inner edge 16 of the sealing disc 11 is provided with a sealing lip 17, which is formed from an elastomer and which abuts against the inner bearing ring 2 and is thus operatively connected in a sealing manner.

For sealing an annular space 18 between the two bearing rings 2, 3, the sealing disc 11 with its internal thread 15 provided on the axial flange 13 is screwed onto the external thread 10 on the lowered shell surface 8 of the outer bearing ring 3. To facilitate screwing of the sealing disc 11 onto the outer bearing ring 3, a receptacle 19 in the form of a blind hole is indicated in the sealing disc 11, which is suitable for receiving a tool in the form of a rod (not shown) to rotate the sealing disc 11 relative to the outer bearing ring 3.

Even though the lowering of the outer shell surface 5 of the bearing ring 3 and the receiving of the axial flange 13 in the lowering has advantages with respect to the flushness of the rolling bearing 1, in another exemplary embodiment not shown, the first connecting means in the form of the external thread 10 can also be mounted directly on the outer shell surface 5 of this bearing ring 3, which then results in a radial projection of the sealing disc 11 from the outer shell surface 5 when the sealing disc 11 is screwed on.

Figure 2:
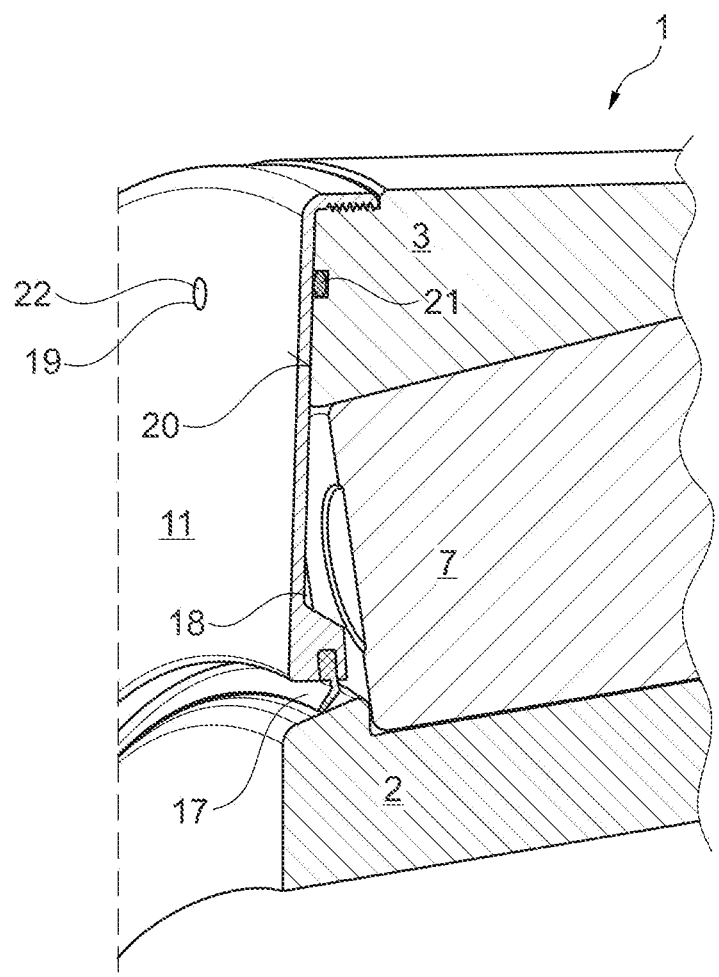
FIG. 2 shows a second embodiment in a representation according to FIG. 1.

FIG. 2 differs from the embodiment according to FIG. 1 only in that an O-ring 21 is provided on an end face 20 of the outer bearing ring 3. If the sealing ring 11 is screwed to the outer bearing ring 3 in the manner described above, the sealing ring 11 comes closer and closer to the end face 20. If, when the sealing ring 11 is screwed on, it comes into contact with the inserted O-ring 21, the latter will be pressed flat by the sealing ring 11 when it is screwed on further. This flattening of the O-ring 21 serves two functions, namely it ensures that no lubricant can leave the annular space 18 via the screw connection and also that a force is exerted by the O-ring 21 on the sealing disc 11, which prevents a loosening of the screw connection during operation of the rolling bearing 1.

Furthermore, the receptacle 19 according to FIG. 2 is not merely a blind hole, but a through hole provided with an inner thread 22. This inner thread 22 not only allows a tool (not shown) that can be screwed into the inner thread 22 to effect the rotation of the scaling disc 11 relative to the outer bearing ring 3 to be secured, but when the scaling disc 11 has assumed its end position on the outer bearing ring 3, it can also be used to secure against rotation by screwing in grub screws (not shown).

Figure 3:
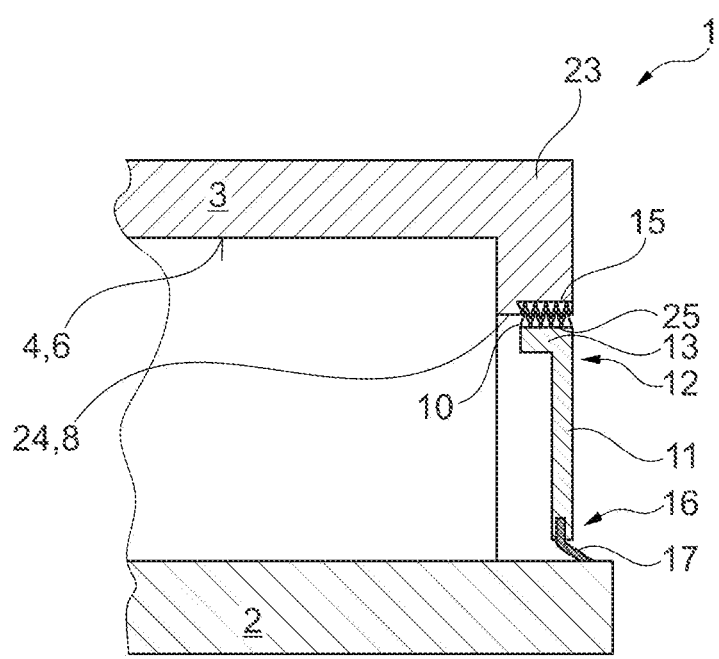
FIG. 3 shows a third embodiment in a side view.

FIG. 3 shows a rolling bearing 1 in the form of a cylindrical roller bearing. The inner bearing ring 2 is designed without a rib, while the outer bearing ring 3 is provided with a rib 23. Consequently, the inner shell surface 4 of the outer bearing ring 3 is formed by the raceway 6 and a laterally adjacent one radial shoulder 8 rib shell surface 24. The internal thread 15 is provided in the rib shell surface 24 as the first connecting means. Furthermore, a sealing layer disc 11 is shown, with the axial flange 13 adjoining the outer edge 12. An outer edge surface 25 of the axial flange 13 is provided with second connecting means in the form of the external thread 10.

As already shown in connection with FIGS. 1 and 2, a sealing lip 17 also adjoins the inner edge 16 of the sealing disc 11 in FIG. 3. In order to seal the rolling bearing 1 shown in FIG. 3, the sealing disc 11 is merely screwed into the internal thread 15 on the rib shell surface 24 via the external thread 10.

For the sake of completeness only, it should be noted that in the case of an outer bearing ring 3 without a rib 23 according to FIG. 3, the first connecting means in the form of the internal thread 15 can be cut into the inner shell surface 4 of the bearing ring 3.

Figure 4:
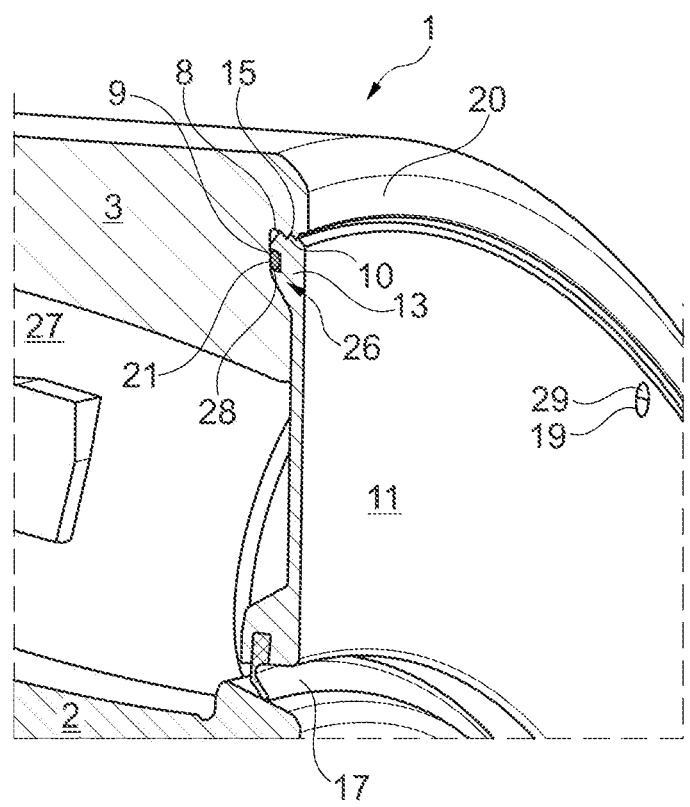
FIG. 4 shows a fourth embodiment in a representation according to FIG. 1.

The exemplary embodiment according to FIG. 4 is, in turn, concerned with a rolling bearing 1 in the form of a spherical roller bearing. In contrast to the embodiment according to FIG. 3, an annular groove 26 is brought into the end face 20 of the outer bearing ring 3, wherein in this exemplary embodiment the radial shoulder 8 of this annular groove 26 is provided with first connecting means in the form of the internal thread 15. To connect the sealing disc 11 to the bearing ring 3, the axial flange 13 is provided with the external thread 10 and screwed to the radial shoulder 8 of the annular groove 26 with the internal thread 15. Since the axial flange 13 is received by the annular groove 26 after screwing and the end face 20 of the outer bearing ring 3 is provided with an axial retraction 27 with respect to the end face 20 of the bearing ring 3 and which adjoins the annular groove 26 radially inwards, the screwed-in sealing disc 11 closes the rolling bearing 1 shown in a flush manner, i.e., without axial projection.

As an additional sealing, according to the exemplary embodiment shown in FIG. 4, the O-ring 21 is provided which is inserted into a groove 28 in the axial flange 13 and which, after the sealing ring 11 and bearing ring 3 have been connected, rests against the ring wall 9 of the annular groove 26. To secure the sealing disc 11 against rotating after mounting in the bearing ring 3, a grub screw 29 is screwed into a receptacle 19 formed as a threaded hole.

In FIGS. 5*a* to *d*, the connecting means of bearing ring 3 and sealing disc 11 are formed by exposed annular edges.

The first annular edge 30 is provided on the outer bearing ring 3 and is formed by the circumstance that, in this exemplary embodiment, a circumferential groove 31 is formed in the inner shell surface 4 of this bearing ring 3. The first annular edge 30 thus exposed is provided with openings 32, of which, however, only one opening 32 is shown in FIGS. 5*a, b* and *d*.

A hook-shaped shoulder segment 34 is provided on an inner side 33 of the scaling disc 11 as shown in FIG. 5*c*, an axial region 35 of which extends from the inner side 33 of the sealing disc 11 and a radial region of which, which forms a second annular edge 36, runs along the inner side 33 of the sealing disc 11 while maintaining a distance A from the plane formed by the sealing disc 11. Although only one shoulder segment 34 is shown in FIG. 5*c*, in another exemplary embodiment not shown, the sealing disc 11 can also be provided with two or more shoulder segments 34 on its inner side 33, such that the radial regions of all shoulder segments 34 ultimately form the second annular edge 36 of the sealing disc 11.

To connect the sealing disc 11 to the bearing ring 3, the sealing disc 11 (FIG. 5*c*) is pushed onto the bearing ring 3 (FIG. 5*b*) in the direction of the arrow P1 by engaging the respective shoulder segments 34 in the openings 32. For this purpose, the respective shoulder segments 34 are formed complementary to the respective openings 32 in the first annular edge 30. Once the shoulder segments 34 have passed through the openings 32, conditions are established as shown in FIG. 5*d*, which provides a view of a first end E1 of the shoulder segment 34 inserted into the opening 32.

As can be seen from the detailed drawing, which shows a view into the shoulder segment 34 according to FIG. 5*c*, the shoulder segments 34 has a first and a second end E1, E2 in the circumferential direction, wherein an axial distance A1 between the inner side 33 of the scaling disc 11 and the second annular edge 36 at the first end E1 is greater than an axial distance A2 between the inner side 33 of the sealing disc 11 and the second annular edge 36 at the second end E2.

This positioning of the second annular edge 36 relative to the inner side 33 of the sealing disc 11 can be used to connect the sealing disc 11 to the bearing ring 3 in a captive manner, namely by wedging. When the respective shoulder segments 34 of the sealing disc 11 are inserted into the openings 32 in the bearing ring 3, the conditions shown in FIG. 5*d* are established. The detail according to FIG. 5*d*, which involves a view in the direction ZZ according to FIG. 5*d*, namely makes it clear that the shoulder segment 34 shown there, when it has passed through the opening 32, faces the first annular edge 30 defining the opening 32 in the circumferential direction with its ends E1, E2 pointing in the circumferential direction. If the sealing disc 11 is now rotated counterclockwise (indicated by the arrow P2), the first annular edge 30, whose axial width B is smaller than the distance A1, enters into the distance A1. However, since the distance A1 in the direction of rotation of the sealing disc 11 decreases to the distance A2 at the end E2 of the shoulder segment 34 and this distance A2 is smaller than the axial width B of the first annular edge 30, the second annular edge 36 wedges against the first annular edge 30 and thus secures the sealing disc 11 to the bearing ring 3.

To improve the sealing effect, the O-ring 21 is provided, which in this case is arranged in an overlap region U between both annular edges 30, 36.

LIST OF REFERENCE SYMBOLS

1 Rolling bearing
2 Inner bearing ring
3 Outer bearing ring
4 Inner shell surface
5 Outer shell surface
6 Raceway
7 Rolling element
8 Radial shoulder
9 Ring wall
10 External thread
11 Sealing disc
12 Outer edge
13 Flange
14 Inner edge surface
15 Internal thread
16 Inner edge
17 Scaling lip
18 Annular space
19 Receptacle
20 End face
21 O-ring
22 Internal thread
23 Rib
24 Rib shell surface
25 Outer edge surface
26 Annular groove
27 Axial retraction
28 Groove
29 Grub screw
30 First annular edge
31 Circumferential groove
32 Opening
33 Inner side
34 Shoulder segment
35 Axial region
36 Second annular edge

The invention claimed is:
1. A rolling bearing, comprising:
an inner bearing ring and an outer bearing ring, each bearing ring having an inner shell surface defining respective raceways and an outer shell surface,
rolling elements received in the raceways, and a sealing disc connected to one of the inner and outer bearing rings and operatively connected in a sealing manner to the other of the inner and outer bearing rings, wherein one of the inner and outer shell surfaces of the one of the inner and outer bearing rings includes a first connecting means and the sealing disc includes a second connecting means, wherein the first connecting means provide a rotating engagement in which the second connecting means engage in a connected state of the one of the inner and outer bearing rings and the sealing disc.

2. The rolling bearing according to claim 1, wherein the first and second connecting means are each formed as threads.

3. The rolling bearing according to claim 1, wherein the one of the inner and outer bearing rings includes a radial shoulder on which the first connecting means is formed, a diameter of the radial shoulder being different from respective diameters of the inner and the outer shell surfaces of the one of the inner and outer bearing rings.

4. The rolling bearing according to claim 1, wherein: the first connecting means has a first annular edge and the second connecting means has a second annular edge, wherein, in the connected state of the one of the inner and outer bearing rings and the sealing disc, the first and second annular edges overlap one another in an overlap region, wherein the first annular edge includes at least one opening, wherein the second annular edge is formed by at least one shoulder segment, wherein a plane in which the at least one shoulder segment lies maintains an axial distance from a plane of the sealing disc, and wherein the at least one opening and the at least one shoulder segment are complementary to one another.

5. The rolling bearing according to claim 4, wherein the at least one shoulder segment has first and second ends in a circumferential direction, wherein axial distances of the first and second ends of the at least one shoulder element to the plane of the sealing disc are different.

6. The rolling bearing according to claim 1, further comprising an O-ring compressed between the sealing disc and an end face of the one of the inner and outer bearing rings.

7. The rolling bearing according to claim 1, wherein the sealing disc is formed of metal or plastic and includes a sealing lip made of rubber or plastic.

8. The rolling bearing according to claim 1, wherein the sealing disc includes receptacles configured to receive tools or grub screws.

9. The rolling bearing according to claim 1, wherein the rolling bearing is a spherical roller bearing.

10. The rolling bearing according to claim 1, wherein the rolling bearing has an outer diameter greater than 320 millimeters.

11. A rolling bearing, comprising:
an inner bearing ring and an outer bearing ring, each bearing ring including a shell surface; and
a sealing disc non-rotatably connected to one of the one of the inner and outer bearing rings and engaged with the other of the one of the inner and outer bearing rings, the sealing disc being rotatable relative to the other of the one of the inner and outer bearing rings;
wherein the shell surface of the one of the inner and outer bearing rings includes first threads, and the sealing disc includes second threads configured to rotatably engage the first threads, the sealing disc being non-rotatably connected to the one of the inner and outer bearing rings via the first and second threads.

12. The rolling bearing of claim 11, wherein the one of the inner and outer bearing rings includes a radial shoulder extending from the one of the inner and outer bearing rings towards the other of the inner and outer bearing rings, the first threads being disposed on the radial shoulder.

13. The rolling bearing of claim 11, further comprising an O-ring compressed between the sealing disc and the one of the inner and outer bearing rings.

14. The rolling bearing of claim 11, wherein the sealing disc includes receptacles configured to receive grub screws.

15. The rolling bearing of claim 11, wherein the sealing disc includes an inner lip abutting the other of the inner and outer bearing rings, the inner lip being formed of an elastomer.

16. A rolling bearing, comprising:
an inner bearing ring and an outer bearing ring, each bearing ring including a shell surface; and
a sealing disc non-rotatably connected to one of the inner and outer bearing rings and engaged with the other of the inner and outer bearing rings, the sealing disc being rotatable relative to the other of the inner and outer bearing rings;
wherein the sealing disc includes a shoulder segment and the shell surface of the one of the inner and outer bearing rings includes a first annular edge having an opening configured to receive the shoulder segment, the sealing disc being non-rotatably connected to the one of the inner and outer bearing rings via the shoulder segment and the; and
wherein the shoulder segment includes a first end and second end spaced from the first end in a circumferential direction relative to the rolling bearing, the first end and the second end extending different amounts in an axial direction relative to the rolling bearing.

17. The rolling bearing of claim 16, wherein the shoulder segment includes a second annular edge, the first and second annular edges overlapping each other when the sealing disc is non-rotatably connected to the one of the inner and outer bearing rings.

18. The rolling bearing of claim 17, further comprising an O-ring compressed between the first and second annular edges.

19. The rolling bearing of claim 16, wherein the shoulder segment is wedged against the first annular edge.

* * * * *